United States Patent [19]

Higuchi et al.

[11] Patent Number: 4,461,679

[45] Date of Patent: Jul. 24, 1984

[54] METHOD OF MAKING STEEL SHEET PLATED WITH PB-SN ALLOY FOR AUTOMOTIVE FUEL TANK

[75] Inventors: Seizun Higuchi; Minoru Kamada, both of Kitakyushu; Kazuhiro Tano, Nakama; Tetsuo Fushino, Kitakyushu; Minoru Fujinaga, Fukuoka, all of Japan

[73] Assignee: Nippon Steel Corporation, Tokyo, Japan

[21] Appl. No.: 456,434

[22] Filed: Jan. 7, 1983

Related U.S. Application Data

[62] Division of Ser. No. 245,973, Mar. 20, 1981, Pat. No. 4,413,039.

[30] Foreign Application Priority Data

| Oct. 2, 1979 | [JP] | Japan | 54-135901 |
| Mar. 22, 1980 | [JP] | Japan | 55-35762 |
| Aug. 8, 1980 | [JP] | Japan | 55-108362 |
| Aug. 25, 1980 | [JP] | Japan | 55-115967 |

[51] Int. Cl.$^3$ .................. C25D 5/10; C25D 5/50; B05D 1/18
[52] U.S. Cl. .................. 204/27; 204/37.3; 204/38 B; 204/40; 427/398.1; 427/405; 427/433
[58] Field of Search .............. 204/27, 28, 37 T, 38 B, 204/40; 427/374.4, 374.5, 374.6, 398.1, 398.2, 398.3, 398.4, 405, 433

[56] References Cited

U.S. PATENT DOCUMENTS

| 2,303,035 | 11/1942 | Fink | 204/40 |
| 3,639,218 | 2/1972 | Missel | 204/40 |
| 3,875,027 | 4/1975 | Gondek | 204/28 |
| 3,950,141 | 4/1976 | Roemer | 428/643 |
| 3,997,301 | 12/1976 | Yoshihara et al. | 204/40 X |
| 4,104,135 | 8/1978 | Fujimaki et al. | 204/37 T |

FOREIGN PATENT DOCUMENTS

| 50-6533 | 1/1975 | Japan | 427/398.3 |
| 52-130433 | 1/1977 | Japan | . |

Primary Examiner—G. L. Kaplan
Assistant Examiner—William T. Leader
Attorney, Agent, or Firm—Cushman, Darby & Cushman

[57] ABSTRACT

A steel sheet plated with Pb-Sn alloy, suitable for use as the material of automobile fuel tanks for containing fuel having alcoholic content. The steel sheet has an NiSn alloy layer or a composite layer including a backing Ni layer and the NiSn alloy layer; the NiSn alloy layer or the composite layer being formed on the steel surface to have a thickness of 0.035 to 1μ; and a plating layer of Pb-Sn system alloy formed on the sole NiSn layer on the NiSn layer of the composite layer. The steel sheet plated with Pb-Sn alloy can be produced by plating the steel sheet with Ni backing, forming a Pb-Sn system alloy layer by a hot dip plating, and rapidly cooling the steel sheet. Alternatively, the steel sheet plated with Ni is subjected to successive electroplating with Sn and then with Pb, and is then treated at a specific temperature for melting and diffusing Sn into Ni to form the NiSn layer.

2 Claims, No Drawings

METHOD OF MAKING STEEL SHEET PLATED WITH PB-SN ALLOY FOR AUTOMOTIVE FUEL TANK

CROSS REFERENCE TO RELATED APPLICATIONS

This application is a division of our earlier co-pending application Ser. No. 245,973 filed Mar. 20, 1981, now U.S. Pat. No. 4,413,039 issued Nov. 1, 1983.

BACKGROUND OF THE INVENTION

The present invention relates to a steel member such as tube, plate, bar, wire or the like plated with a Pb-Sn alloy to have an increased corrosion resistance, suitable for use as the material of a fuel tank for gasoline, alcoholic fuel or the like, as well as to a method of producing the same.

Hitherto, steel material plated with Pb-Sn alloy has been used as materials of various parts such as automobile fuel tank, parts of radiator, chemical vessel and so forth, because of superior corrosion resistance, solderability and workability, as well as moderate cost.

However, Pb as the plating metal and the steel can hardly react with each other to make the formation of the alloy layer therebetween difficult. In addition, since the Pb itself is liable to be oxidized, it is difficult to adjust the amount of deposition of the plating alloy, often resulting in a problem of formation of pin holes. It is also to be pointed out that the Pb-Sn alloy which is inherently soft tends to be damaged during handling or the press work to develop scratches or pin holes. This also promote the generation of rust particularly when the material is used under a corrosive environment.

Recently, due to the shortage of crude oil resources, there is an increasing need for alcoholic automobile fuel in which alcohol such as methyl alcohol, ethyl alcohol, methyl tertiary butyl ether or the like (generally referred to as "gasohol" or even pure alcohol fuel. This gives a rise to a demand for steel sheet plated with Pb-Sn alloy having higher corrosion resistance and capable of suppressing the formation of pin holes as compared with conventional steel sheet plated with Pb-Sn alloy.

Various proposals have been made to cope with this demand. For instance, it has been proposed to effect the coarseness of the surface of the substrate material through a heavy pickling for long time and at high temperature, thereby to increase the reactivity and mechanical bonding between the steel and the Pb-Sn plating alloy. It has also been proposed, in order to prevent the generation of pin holes due to inadequate roll squeezing for adjusting the amount of deposition of the plating alloy, to conduct the roll squeezing while covering the entire surface of the plating bath with a flux or palm oil, irrespective of whether the roll squeezing is effected by a pair of rolls to which the flux is deposited or by means of a high-pressure gas wiping.

Also, in the specification of U.S. Pat. No. 3,875,027 (corresponds to Japanese Patent Publication No. 29986/1976), as well as in Japanese Patent Publication No. 51426/1980 issued to the present inventors, proposed are new methods effective for preventing generation of pin holes in the Pb-Sn alloy plated steel sheet, in which the steel sheet is beforehand plated with Ni in advance to the plating with molten Pb-Sn alloy.

More specifically, in the method proposed in the specification of U.S. Pat. No. 3,875,027, the plating with Pb-Sn alloy (Terne plating) is effected after a plating with Ni to a thickness of 7.62 to 48.3$\mu$. The aforesaid plated steel sheet is used mainly as the pipe material of automobile fuel tanks. In the method disclosed in Japanese Patent Publication No. 51426/1980, the plating with molten Pb-Sn alloy (Terne plating) is effected after having applied Ni plating to a thickness of 0.03 to 1.0$\mu$. According to this method, it is possible to produce steel sheet plated with Pb-Sn alloy having a high corrosion resistance and reduced number of pin holes, even when the pickling before the plating with molten Pb-Sn alloy are simplified.

Another proposed method is to effect an undercoating treatment on the steel surface by forming a single plating layer of Zn, Sn, Cu or the like in advance to the plating with the molten Pb-Sn alloy, as in the case of the pretreatment with Ni stated before. The Zn and Sn in the undercoating layer, however, is liable to be re-dissolved in the plating bath of Pb-Sn alloy during the subsequent plating with Pb-Sn alloy. Also, the Cu does not show a good adhesion to steel so that sufficient effect for preventing the generation of pin holes cannot be obtained. The Ni has an appreciable effect on prevention of the generation of pin holes. However, in the conventional process, the Ni inconveniently forms fragile Ni-Sn layer such as $Ni_3Sn_2$, $Ni_3Sn_4$ phases or the like to reduce the adhesion between the Ni layer and the Pb-Sn alloy plating layer often resulting in a separation during press work, particularly when the plating dipping time is too long or when the cooling after the plating is effected too gradually.

As is well known, automobile fuel tanks are produced by subjecting the material to a considerably severe shaping or forming process, such as having a shape of 300 mm height including bulging work. It is, therefore, essential that the bonding strength between the steel sheet and the plating layer is sufficiently high to avoid separation of the latter during the forming work.

In general, in order to avoid separation of plating layer in the subsequent mechanical work of metal-plated products, it is necessary that the thickness of the plating layer is not excessively large.

In the case where the metal plating is effected on a steel sheet by employing a heating means as in the case of hot dip plating, heating diffusion or the like, the main plating layer is deposited usually through an intermediate alloy layer or layers. This alloy layer is formed of an intermetallic compound which is generally hard and brittle. For instance, in the case of hot dip plating with molten Zn, an intermetallic compound of Zn-Fe alloy system is formed, while, in the case of ordinary hot dip plating with molten Pb-Sn alloy, an intermetallic compound of Fe-Sn system is formed. It is well known that the bonding strength of the plating layer is seriously decreased if this alloy layer has a large thickness. Thus, a too large thickness of this alloy layer is not preferred also, in order to obtain high bonding strength of the plating layer.

This phenomenon is observed also in the case where the Pb-Sn alloy, which generally is soft and has a high lubricating effect, is used as the coating layer, as well as in the aforementioned case where an undercoating layer of Ni is formed to present the possibility of formation of an alloy of Ni and Sn on which the plating layer of Pb-Sn alloy is formed.

From this point of view, the product plated with Pb-Sn alloy shown in the specification of the U.S. Pat.

No. 3,875,027 is mainly directed to steel piping subjected to bending or slight bending, so it cannot be used suitably as the material of automobile fuel tanks, because of a large susceptibility to separation of the plated layer during the mechanical forming work which is conducted under a severe condition.

The Japanese Patent Publication No. 51426/1980 proposes a technique which offers the following advantages.

(1) Shortening and simplification of pretreatment pickling.

(2) An alloy layer of Ni-Sn alloy is formed uniformly instead of the Fe-Sn alloy to reduce the formation of pin holes after the plating with molten Pb-Sn alloy.

(3) Even when the alloy layer is exposed during the control of the deposition amount, no rust is formed because the alloy layer is of Ni-Sn system, in contrast to the case where the alloy layer is of an Fe-Sn alloy.

(4) The Ni undercoating layer and the Pb-Sn alloy plating layer provide superposed effect on the prevention of generation of pin holes.

Thanks to the above-listed features, this method permits the production of corrosion-resistant product plated with molten Pb-Sn alloy, even when the pretreatment by pickling is conducted at a high speed and in a simplified manner.

These prior arts explained heretofore are merely the technique for producing products plated with Pb-Sn alloy, highly resistant to corrosion and having reduced number of pin holes. At the present stage, however, it is not considered that a technique has been established for the production of materials having a steel sheet base, a Ni undercoating layer and a plating layer of Pb-Sn alloy formed by hot dip plating, optimum for use as the material of automobile fuel tank, particularly suitable for the material of tank for fuel having alcoholic content.

SUMMARY OF THE INVENTION

It is, therefore, a major object of the present invention to provide a steel sheet having an undercoating layer of Ni and a Pb-Sn alloy coating layer formed by hot dip plating on the Ni undercoating or backing layer, suitable for use as the material of tanks for fuel having alcoholic content, while preserving the high corrosion resistance of this material.

Recently, in view of an electronic control of fuel system of adopted in automobile engine, reduction of weight of the automobile, shortage of crude oil resource and so forth, there is an increasing need for the alcoholic fuel (alcohol-added gasoline, i.e. so-called gasohol and pure alcohol) which in turn gives rise to a demand for superior material for fuel tanks over the conventional materials.

More specifically, it is required to fulfill the following requirements.

(1) The material should have a superior workability and shapability and should exhibit no separation of plating layer during shaping into the form of a fuel tank.

(2) The material should exhibit a high resistance to the corrosive content such as impurities, water content which is formed as a result of a dewing and so forth, not to mention to the gasoline itself. Also, the material should reduce the amount of corrosion products which would cause a clogging in the fuel system. This requirement is particularly strict when an electronic fuel control is adopted.

(3) The material should have longer life than conventional materials, considering that the weight of the fuel tank has to be reduced to cope with the demand for reduction of weight of the automobile as a whole.

(4) The material should exhibit a sufficient corrosion resistance against the alcohol, the water content of which is greater than in gasoline, peroxides (formaldehyde, acetoaldehyde e.t.c.) and organic acids (formic acid, acetic acid e.t.c.) which are formed as a result of oxidation of alcohol.

The invention aims at making it possible to apply the steel sheet having an undercoating Ni layer and a Pb-Sn alloy plating layer to the production of automobile fuel tanks, while improving the known technique shown in the aforementioned Japanese Patent Publication No. 51426/1980 to fulfill the above-listed requirements (1) to (4).

To this end, according to the invention, following materials and methods are provided.

(1) Steel sheet plated with a Pb-Sn system alloy, having a double layer of an NiSn phase alloy layer formed on the steel surface and a Pb-Sn alloy formed on the Ni-Sn alloy layer, suitable for use as material of automobile fuel tank.

(2) Steel sheet plates with Pb-Sn system alloy, suitable for use as the material of automobile fuel tank, having a tripple layer including an Ni layer, an NiSn alloy layer and a Pb-Sn alloy.

(3) Method of producing a steel sheet plated with Pb-Sn system alloy suitable for use as the material of automobile fuel tank, having the steps of forming on the surface of a steel sheet an Ni layer of a thickness 0.01 to less than $1\mu$, dipping the Ni-coated steel sheet in a Pb-Sn system alloy plating bath of held at a temperature of 320° to 400° C. for 1 to 10 seconds and cooling quickly the plated steel sheet down to a temperature below 300° C. within 3 seconds.

(4) Method of producing steel sheet plated with Pb-Sn system alloy suitable for use as the material of automobile fuel tank for alcoholic fuel or pure alcoholic fuel, the method has the steps of plating a steel sheet with Ni, effecting an electroplating with Sn, effecting an electroplating with Pb, and subjecting the plated steel sheet to a heat treatment which is conducted at a temperature ranging between 232° and 400° C.

The present invention has been achieved as a result of various studies and experiments conducted on the method in which the steel sheet is plated with Ni and then further plated with a Pb-Sn alloy, particularly on the nature of the Ni-Sn alloy layer which is formed as a result of reaction between Ni and Sn.

(1) Namely, according to the invention, among various alloy layers formed as a result of reaction between Ni and Sn, e.g. NiSn, Ni$_3$Sn$_2$, Ni$_3$Sn$_4$, the NiSn which is known as exhibiting the superior corrosion resistance is formed mainly at the interface between the steel surface and the Pb-Sn alloy plating layer or at the interface between the Ni plating layer and the Pb-Sn alloy plating layer. The invention also proposed conditions effective for the formation of the NiSn alloy at such an interface.

If the steel sheet of the invention is produced by a hot dip plating technique, the conditions of the plating with Pb-Sn alloy, and the rate of cooling after the plating, particularly the latter, are important factors. In the case where the plating is effected by an electroplating, the condition of heating and melting after the plating and the cooling condition, particularly the latter, are important factors.

By carefully selecting these factors, the present inventors have found out the conditions for forming mainly the NiSn phase layer while suppressing the formation of other Ni-Sn alloys.

(2) The NiSn alloy layer exhibits a good corrosion resistance but has small workability. In order to assure high workability, according to the invention, the thickness of the NiSn layer which adversely affects workability of the plated steel sheet is limited while weighing the corrosion resistance. Namely, the NiSn layer or the sum of Ni layer and NiSn layer, were controlled to have a total thickness of 0.035 to 1µ.

By combining the features (1) and (2) stated above, the present inventors have succeeded in establishing an industrial technique which can fully satisfy the aforementioned requirements (1) to (4).

DESCRIPTION OF THE PREFERRED EMBODIMENTS

The invention will be more fully understood from the following description of the preferred embodiments.

According to the invention, a steel sheet plated with Pb-Sn alloy is formed to have a double layer structure including an NiSn alloy plating layer and a Pb-Sn system alloy plating layer or a tripple layer structure including an Ni plating layer, NiSn alloy plating layer and a Pb-Sn system alloy plating layer, by effecting a pretreatment such as degreasing, pickling and so forth on the material steel sheet, effecting an Ni plating treatment on the pretreated steel surface and then effecting a plating with a Pb-Sn system alloy.

This Ni plating is effective in remarkably preventing the pin holes which are formed in the subsequent Pb-Sn system alloy plating step from reaching the surface of the steel base, in the improvement in the corrosion resistance and in the formation of a composite plating layer including an NiSn alloy plating layer which has a superior corrosion resistance and hence, fulfills the aim of the invention.

Namely, according to the invention, the Ni layer is formed to have a predetermined thickness by an electroplating or the like method and then hot dip plating (terne plating) is effected to form the plating layer of a Pb-Sn alloy. Since the Ni plating layer as a backing layer exhibits a good wettability, the condition for the terne plating is improved remarkably while reducing the partial unplating or pin holes. In addition, the Ni plating layer reacts with the Sn in the hot plating bath to form an Ni-Sn system alloy plating layer mainly consisting of NiSn phase alloy having a uniform and densely formed structure.

In consequence, the product in accordance with the invention after the hot dip plating exhibits a remarkably reduced number of pin holes and partial unplating. Namely, plating defect reaching the steel base surface is greatly reduced to improve the corrosion resistance.

In addition to these advantages, there is a further enhancement of the corrosion resistance due to the formation of the NiSn phase alloy layer, hereinafter merely referred to NiSn alloy layer as will be understood from the following description.

(1) In the product hot-dip-plated with Pb-Sn system alloy, the Pb-Sn plating layer is often dropped or stripped partially to form a plating defect through which the alloy layer underlying the Pb-Sn alloy layer is exposed. This plating defect is caused by various reasons such as inadequate control on the amount of metal deposition, non-uniform solidification of the molten Pb-Sn alloy attributable to the surface tension, and so forth. According to the invention, however, the layer exposed through such a plating defect is the NiSn alloy layer which has a superior corrosion resistant and do not product any rust. Namely, the NiSn alloy layer exhibits a much superior corrosoin resistance to the Fe-Sn system alloy layer (mainly $FeSn_2$) formed in the conventional Pb-Sn-plated steel sheet.

(2) For the same reason as the item (1) above, although the final Pb-Sn layer by hot dip plating may have non-uniform thickness to permit an early corrosion of the thin portion thereof, the NiSn layer revealed from such portion exhibits a sufficiently high corrosion resistance so that the life of the product is prolonged remarkably as compared with the conventional steel sheet hot-dip-plated with Pb-Sn system alloy.

(3) The Pb-Sn system alloy plating layer is liable to be damaged during handling, because it is so soft. However, even if the Pb-Sn system alloy plating layer is damaged, the underlying NiSn layer provides a sufficient corrosion resistance to ensure the longer life of the product plated with Pb-Sn system alloy.

It will be seen that the steel sheet of the invention, plated with Pb-Sn system alloy constituted by a composite plating layer including an NiSn layer, exhibits a superior corrosion resistance.

In effecting the hot dip plating with the molten Pb-Sn system alloy subsequent to the Ni plating operation, the Ni reacts with the Sn in the molten alloy plating bath to form an Ni-Sn system alloy layer mainly consisting of NiSn. If the initial Ni plating layer has a small thickness or, depending on the conditions of the hot dip plating or subsequent cooling, the whole part of the Ni plating layer is changed into the NiSn alloy layer. To the contrary, when the initial Ni plating layer has a considerably large thickness or depending on the conditions of the subsequent treatment, the Ni layer is changed into a double layered structure having a backing or underlying layer of Ni and an overlying layer of the NiSn alloy.

The presence of the NiSn alloy layer between the steel surface and the Pb-Sn alloy plating layer or between the Ni layer and the Pb-Sn alloy layer permits strong bonding of the Pb-Sn alloy layer to the steel surface, while achieving the reduction of pin holes and improvement in the corrosion resistance.

The material is subjected to a severe forming work when it is shaped into the form of an automobile fuel tank. As a result of this severe forming work, flaws are often formed in the Pb-Sn system alloy plating layer. According to the invention, however, the generation and propagation of corrosion and rust, caused by the gasoline, impurities in the gasoline and water content produced by the forming of dew or the like, is remarkably reduced even when such a flaw is formed, thanks to the presence of the NiSn alloy plating layer.

As compared with the conventional one, the steel sheet plated with Pb-Sn system alloy including an NiSn alloy layer of the invention offers the following advantages when used as the material of automobile fuel tank. Partly because the generation of pin holes reaching the steel base surface is reduced, and partly because the NiSn alloy layer prevents the corrosion attributable to a fault in the Pb-Sn plating layer or flaw caused in the mechanical processing, the formation of corrosion products such as rust is very much suppressed to ensure a longer life of the fuel tank. These effects are particularly remarkable when the fuel tank is used for alcoholic fuel such as gasohole (alcohol-containing gasoline), pure alcohol and so forth.

Namely, as compared with conventional fuel mainly consisting of gasoline, the alcoholic fuel has an extremely high possiblity of containing water and oxides of alcohol in the form of impurities. For instance, when the alcohol is ethyl alcohol, acetoaldehyde and acetic acid are formed as the oxides, whereas, when methyl alcohol is used as the alcohol source, formaldehyde and formic acid are formed as the oxides. It is, therefore, essential that the material for fuel tanks containing alcoholic fuel has a high corrosion resistance against the oxide and peroxides.

In this connection, it is quite advantageous that the steel sheet plated with Pb-Sn alloy through an intermediate backing plating layer of NiSn alloy exhibits a high resistance to the corrosive alcoholic fuel.

Namely, in the steel sheet of the invention, the Pb-Sn alloy plating layer is formed on the backing plating layer consisting solely of an NiSn alloy layer or of a double-layered structure including Ni layer plus NiSn alloy layer. In consequence, the formation of pin holes which would reach the steel base surface is greatly suppressed. In addition, the plating defect or flaw in the Pb-Sn alloy plating layer does not cause positive corrosion because the underlying NiSn alloy layer provides, as is well known, a high resistance to formic acid and acetic acid which are formed as a result of oxidation of alcohol. Therefore, even when the NiSn alloy layer is exposed due to a plating defect or a flaw caused during the mechanical processing, the exposed NiSn layer exhibits a sufficiently high resistance against corrosion to ensure the longer life of the fuel tank.

The Pb-Sn alloy plating layer itself has a comparatively small corrosion resistance to formic acid and acetic acid. The life of the Pb-Sn alloy plating layer, however, is remarkably increased thanks to the presence of the underlying NiSn alloy layer which has a high corrosion resistance.

Thus, the product of the invention exhibits an excellent corrosion resistance when used as the material of fuel tank, particularly of the fuel tank which is used for alcoholic fuels.

In order to achieve this remarkable effect, it is necessary that the thickness of the NiSn alloy layer or the total thickness of the Ni layer and Ni-Sn layer ranges between 0.035 and 1$\mu$, and that the thickness of the Ni plating layer for forming the NiSn alloy layer is less than 0.01 to 1$\mu$.

Namely, according to the invention, the whole or a part of the Ni plating layer formed on the surface of the steel sheet is changed into the NiSn alloy layer as a result of the subsequent plating with Pb-Sn system alloy. Therefore, the thickness of the NiSn layer or the sum of the thicknesses of the Ni layer plus NiSn layer, formed as the backing layer of the Pb-Sn system alloy plating layer during the formation of the latter, does not always conform with the thickness of the initial Ni plating layer, because of the reaction between Ni and Sn in the Pb-Sn alloy plating bath.

More specifically, the NiSn alloy formed as a result of the reaction between Ni and Sn in the plating bath is considered to owe mainly to the reaction of Ni+Sn-→NiSn. Assuming here that the specific weight of the NiSn alloy is 7.87 (calculated value) and that whole part of the Ni is changed as a result of the reaction into NiSn alloy stoichiometrically, the NiSn alloy formed as a result of the reaction ought to have a thickness which is about 3.4 times as large as that of the initial Ni layer.

With this knowledge, a description will be made hereinunder as to the reasons of limitation of the thicknesses of the NiSn layer, Ni+NiSn layer and the Ni backing plating layer.

If the Ni plating layer has a thickness smaller than 0.01$\mu$, (thickness of NiSn alloy layer less than 0.035$\mu$), it is not possible to coat the surface of the steel sheet uniformly and densely with the NiSn alloy layer or Ni+NiSn alloy layer, and comparatively large number of pin holes are formed so that the object of the present invention cannot be achieved. As will be seen from the annexed Table 1, as the thickness of the Ni plating layer, NiSn alloy layer or the Ni+NiSn layer exceeds 1$\mu$, the corrosion resistance effect is saturated and, on the other hand, the workability of the product is deteriorated to increase the tendency of separation of the plating layer during the mechanical work. It is, therefore, essential that the thickness of Ni layer, NiSn alloy layer and the Ni+NiSn layer be maintained below 1$\mu$.

In order to attain the object of the invention by promoting the formation of the NiSn alloy layer from the Ni backing layer, the thickness of the Ni plating layer preferably falls between 0.05 and 0.3$\mu$, and the thickness of the NiSn alloy layer or Ni+NiSn alloy layer falls between 0.15 and 0.5$\mu$.

In the product of the invention, the Pb-Sn plating layer is formed to have a thickness which is 1.5 to 20$\mu$, preferably 3 to 10$\mu$ greater than that of the NiSn layer or the Ni+NiSn alloy layer. Thanks to the presence of the thick Pb-Sn alloy plating layer which is much softer than the NiSn alloy layer or Ni+NiSn alloy layer, it is possible to obtain a remarkable effect of preventing the damaging of NiSn alloy layer or the Ni+NiSn alloy layer which is harder than the Pb-Sn alloy plating layer, during the mechanical work for shaping the sheet material into a fuel tank.

When the aforementioned Ni backing plating layer takes the upper limit value of thickness of 1$\mu$, the Ni-Sn alloy layer is formed to have a thickness of about 3.4$\mu$, provided that the whole part of the Ni layer is changed into Ni-Sn layer.

It has been confirmed through various experiments, however, that the NiSn alloy layer is formed only to have a thickness of about 1.2$\mu$ at the greatest, when the hot dip plating with Pb-Sn system alloy is conducted under the condition suitable for obtaining the highly corrosion resistant steel sheet plated with Pb-Sn system alloy in accordance with the invention, i.e. under the condition of plating temperature of 320° to 400° C., dipping time of 1 to 10 sec., Sn concentration in plating bath of 1 to 30%, preferably 3 to 15%, more desirably 6 to 12% and the cooling rate of less than 3 seconds from the plating temperature down to a temperature below 300° C.

The production process in which Ni plating layer is formed as a backing layer for the Pb-Sn system alloy plating layer which is formed by a subsequent hot dip plating has been known. However, there has been made no proposal as to the application of this process to the production of steel sheet for use as the material of fuel tank for alcoholic fuels.

The present invention proposes for the first time a steel sheet which can be used as the material of fuel tank for substitutive fuels such as alcoholic fuels the demand for which is increasing recently, in place of the steel sheet for conventional fuel tank which is merely plated with Pb-Sn alloy.

The steel sheet of the invention suitable for use as the material of fuel tank is obtained by the following process. A steel sheet blank is subjected to an ordinary clearing treatment such as degreasing and pickling. On the treated surface of the steel sheet blank, an Ni plating layer is formed by a plating process which may be an electroplating, substitution plating, non-electrolytic plating or the like. The Ni plating layer thus formed has a thickness of less than 0.01 to 1$\mu$, and preferably between 0.05 and 0.3$\mu$, as stated before. Then, after effecting a preparatory flux treatment as required, the steel sheet is dipped for 1 to 10 seconds in a Pb-Sn system alloy plating bath maintained at a temperature of 320° to 400° C. and to which a wet-type flux cell is connected. After extracting the steel sheet from the plating bath, the amount of depositing alloy is adjusted by means of a wiping nozzle, and the steel sheet is cooled quickly. It is preferred that this cooling is effected at a rate as high as possible down to a temperature as low as possible, in order to avoid the generation of $Ni_3Sn_2$, $Ni_3Sn_4$ and so forth which exhibit inferior corrosion resistance to NiSn alloy. Preferably, this cooling is effected down to a temperature below 300° C. within 3 seconds. In order to effectively perform this cooling thickness of the steel sheet is desired to be thinner, say 0.4 to 1.2 mm preferably 0.6 to 1.0 mm, in view of the intended use of this invention. This is because it becomes necessary to increase cooling capacity of the mill for plating steel sheets of larger thickness than 1.0 mm, while it is required to have a thickness of larger than 0.6 mm in order that the fabricated fuel tank has a desired strength.

With respect to the gas wiping procedure for controlling the thickness of plating, temperature of the wiping gas to be used such as pressurised air or nitrogen gas is desired to be lower than 350° C., preferably lower than 50° C.

As to the gas source for said gas wiping, several kind of gases such as air, nitrogen gas, steam mist or mixture of water and high pressure air is blown as gas jet. The above-mentioned limitations of the plating bath temperature and dipping time are made to prevent the generation of $Ni_3Sn_2$ and $Ni_3Sn_4$ which are less resistant to corrosion.

After having stripped of the surface Pb-Sn plating layer, the Ni-Sn alloy layer formed in the process stated above was examined by an X-ray diffraction or an electron beam diffraction. The examination showed a result that almost whole (100%) of Ni-Sn alloy is the NiSn alloy.

Products which were produced under conditions different from the condition mentioned before, e.g. at a plating temperature of 350° C., dipping time of 30 seconds and lower rate of cooling showed inferior performance both in workability and bonding strength, as well as deteriorated corrosion resistance, as compared with the product of the invention. The comparison between the product of the invention and those produced through different processes is shown in annexed Table 2.

The plating bath for Ni plating may be a Watt bath, improved Watt bath or a nickel sulfamide plating bath which is suitable for a plating at a high electric current density. Also, a substitution plating or a non-electrolytic plating can be used for the plating with Ni.

On the other hand, the plating bath for the plating with Pb-Sn system alloy may include Pb-(1–30%)Sn alloy as the basic component. In order to increase the corrosion resistance and the hardness, it is possible to add substances such as Sb, Zn, P, Bi and so forth to the above-mentioned basic component.

In the case where the Ni plating layer is used as the backing layer for the Pb-Sn system alloy plating layer, no substantial degradation in corrosion resistance is caused by a reduction of the amount of Sn. Rather, from a view point of cost, it is advantageous to lower the Sn content down to, for example, 3 to 12%.

As shown in annexed Table 3, Sn content within the range of 6 to 12% was found to be especially effective for good performance of the plated product and its production cost.

The reason for selecting the above-mentioned range is that, if the Sn content is more than 6%, NiSn layer can be readily formed with comparatively thin layer of Ni as long as the thickness of the Ni layer is kept within the limit specified for this invention.

And this also enables to obtain plated steel product of very satisfactory corrosion resistance as well as very flat and smooth appearance, regardless of the varied line speed of plating.

After the hot dip plating with Pb-Sn system alloy, the steel sheet may be subjected to a chemical treatment to further improve the corrosion resistance (anti-pinhole characteristic), without departing from the scope of the invention. This chemical treatment is conducted by dipping the steel sheet for 1 to 20 seconds in a 0.3 to 5% aqueous solution of phosphoric acid, polyphosphoric acid, phytin acid or the like at a temperature between room temperature and 90° C.

In the foregoing embodiments, the steel sheet having an NiSn alloy layer and plated with Pb-Sn system alloy of the invention is formed by effecting a hot dip plating with Pb-Sn system alloy. This method, however, is not exclusive and the above-mentioned steel sheet of the invention can be produced also by the following process.

Namely, according to another embodiment of the invention, after forming an Ni plating layer on the surface of the steel sheet to a thickness of 0.01 to 1$\mu$, an Sn layer and a Pb layer are formed successively by electroplating. Then, the steel sheet is subjected to a heating melting treatment which is effected at a temperature ranging between 232° and 400° C. The product of the invention can be produced also by the process stated above.

In this method, by effecting the heat treatment at a temperature above the melting point of Sn (232° C.), the Sn melts in a short treating time to react with the whole or a surfacial part of the Ni plating layer to form the NiSn alloy layer or the Ni+NiSn alloy layer which is aimed at by the present invention. Thus, this process also permits the production of a steel sheet having a lower layer of NiSn alloy and an upper layer of a Pb-Sn alloy namely, a steel sheet having a lowermost base layer of Ni, intermediate layer of NiSn alloy and the surface plating layer of Pb-Sn alloy.

When this process is applied, it is possible that whole or a part of the Sn or Pb metal remains unreacted so that the plating layer is formed to include an Sn or Pb metallic layer. The steel sheet having such a plating layer is covered by the present invention because the plating layer including the metallic Sn or Pb layer does not adversely affect the property of the product of the present invention.

The heating and melting treatment is conducted at a temperature between the melting point (232° C.) of Sn and 400° C., preferably between 232° C. and the melting point of Pb (327° C.), and more preferably at a temperature ranging between 250° and 315° C. A treating temperature below 232° C. is not preferred because it takes a considerably long time for the alloying treatment although the allowing by solid diffusion between Pb and Sn is possible. In addition, at such a low treating temperature, it is not possible to achieve a refilling of pin holes with molten metal so that no substantial improvement in the corrosion resistance can be expected.

A treating temperature higher than 400° C. permits a prompt melting of Pb and Sn metals to allow an alloying in quite a short period of time. In this case, however, the oxidation of Pb or Sn metal is so serious as to cause undesirable discoloration of the metals. For information, the colors of Pb and Sn metals are changed into light brown and yellow, respectively. In addition, the plating layer has a substantial fluidity in the transient period between the plating and the solidification. In addition, the level of the surface tension is considerably high. Therefore, if any nuclei of solidification is formed any reason, the solidification is promoted in the area around the nuclei, thus resulting in a non-uniform solidification. The heating melting temperature, therefore, is selected to fall between 232° and 400° C.

A heating melting temperature below 327° C. permits a prompt alloying due to diffusion of molten Sn metal into Pb or Ni and provides a remarkable effect of refilling of the pinholes which are formed in the non-molten Pb layer or in the backing Ni layer, thereby to ensure a superior corrosion resistance. The heating melting treatment, therefore, is made at a temperature which ranges preferably between 232° and 327° C. and, from a view point of shortening of the treating time, between 250° and 315° C.

The heating melting treatment can be made in any desired atmosphere, such as ordinary air and non-oxidizing atmosphere, or may be made after application of flux. However, for obtaining a sufficient metallic luster of the final product, the heating melting treatment is made preferably in a non-oxidizing atmosphere or after application of the flux. The non-oxidizing atmosphere may be formed of $N_2$ gas solely or by $N_2$ gas containing 5% $H_2$ (Mix gas).

Aqueous solutions of $ZnCl_2$, $ZnCl_2-NH_4Cl$, $ZnCl_2-SnCl_2$, Sn phenol sulfonic acid, mixture of phenol sulfonic acid and sulfuric acid can be used as the flux. The density of the flux is 10 to 600 g/l and preferably 30 to 450 g/l. The application of the flux is made by immersion or by means of spray of the aqueous solution. After the application, a wiping is effected by means of a roll or a pressurized gas. Thereafter, the material is subjected to the heating melting treatment immediately or after a drying. In case where the application of the flux is made by a roll coater, the material is sent to the heating melting treatment directly or after a drying. The flux temperature ranges between room temperature and 90° C., and the drying is effected at a temperature between 50° and 300° C.

If the heat treatment is effected at a temperature in excess of 300° C., it is preferred also in this case to cool the material rapidly down to the temperature below 300° C., in order to prevent the generation of $Ni_3Sn_2$ and $Ni_3Sn_4$.

The chemical treatment in an aqueous solution having phosphorous ion may be adopted also in this case, in order to improve the corrosion resistance.

The fuel tank is produced by conducting a predetermined shaping work such as press work into the form of a tank and then effecting seam welding. The surface of the thus formed tank may be coated as desired with a paint.

The steel sheet in accordance with the invention exhibits a superior corrosion resistance and workability and, hence, can be optimumly used as the material of fuel tank for containing alcoholic fuel not mention to gasoline. The present invention provides a diversified use of the steel sheet plated with Pb-Sn system alloy to greatly contribute to the development of the field of industry concerned. Needless to say, the steel sheet plated with Pb-Sn system alloy in accordance with the invention can be used as the fuel tank material for fuel tanks containing light oil or kerosene.

In effecting the primary plating or backing with Ni in accordance with the invention, particularly when the primary plating is effected by electroplating, metallic Co, which is contained as an incidental impurity, is included in the Ni plating layer. The steel sheet having an Ni backing plating layer including metallic Co is fairly involved by the scope of the invention.

It is also expected that a layer of Ni-Fe system alloy of a small thickness is formed at the interface between the steel surface and the Ni backing layer, during the hot dip plating wth the Pb-Sn system alloy. Such a formation of the Ni-Fe system alloy layer is also within the scope of the invention.

EXAMPLE 1

A cold rolled steel sheet of 0.8 mm thick was immersed in a 3% aqueous solution of sodium phosphate (90° C., 3 sec.) for degreasing and then subjected to a pickling which was conducted by a 10% aqueous solution of $H_2SO_4$ (90° C., 3 sec.). After a rinsing with water, a primary or backing plating was effected with Ni by an electroplating on the surfaces of the steel sheet to a thickness of $0.11\mu$ at each side. After a rinsing with water, the steel sheet having the Ni backing plating layer was subjected to a wet type flux treatment conducted with 40% (90% $ZnCl_2$-10% NaCl) and was dipped for 5 sec. in an alloy bath of 12% Sn-88% Pb maintained at 350° C. Thereafter, the amount of depositing metal was adjusted by a high pressure gas jet of 0.15 $kg/cm^2$ and at a temperature of 30° C. to obtain an amount of plating metal of 65 $g/m^2$ at each side. Thereafter, a cooled air jet was applied to cool the steel plate down to a temperature below 300° C. within one second to obtain the steel sheet plated with molten Pb-Sn alloy. The steel sheet had an NiSn alloy layer of $0.4\mu$ thick and Pb-Sn alloy plating layer of 65 $g/m^2$ at each side, and showed a superior corrosion resistance and bonding strength of the plating layers.

EXAMPLE 2

A cold rolled steel sheet of 1.0 mm thick was imersed in a 3% aqueous solution of ortho sodium silicate for an electrolytic degreasing (70° C., 10 $A/dm^2$, 3 sec.) and was then subjected to an electrolytic pickling in 10% aqueous solution of HcL (normal temperature, 10 $A/dm^2$, 1.5 sec.). After rinsing with water, an electroplating was effected with Ni on each side of the steel plate to a thickness of $0.2\mu$. The steel sheet having the backing plating layer of nickel was immersed after a rinsing with water, in an alloy bath of 10% Sn-89.9% Pb-0.1% Zn by means of a dry flux method (30% $ZnCl_2$ aqueous solution). The bath temperature and immersion time were 385° C. and 2.5 sec, respectively. Then, after an adjustment of deposition amount by gas jet at 25° C. under a pressure of 0.2 kg/cm² down to 45 g/m² at each side, the steel sheet was applied with vapor mist to be cooled down to a temperature below 250° C. within about 3 seconds, to become a steel sheet plated with Pb-Sn-Zn system alloy by hot dip plating having flat and smooth appearance.

This steel sheet plated with Pb-Sn system alloy had an NiSn layer of about 0.7μ thick and a plating layer of Pb-Sn-Zn alloy of 45 g/m² at each side, and showed an excellent corrosion resistance and bonding strength of the plating layers.

EXAMPLE 3

A cold rolled steel sheet of 0.6 mm thick was subjected to a pretreatment which was conducted under the same condition as Example 1, and was subjected to an electroplating with Ni to form an Ni backing plating layer of 0.3μ thick at each side. After a rinsing with water, the steel sheet having the Ni backing plating layer was immersed in an alloy bath of 7% Sn-93% Pb at 340° C. and for 7 seconds, by a wet flux method [50% ($Zncl_2/NH_4cl=1/1$ (mol ratio)]. Thereafter, a roll drawing was applied to adjust by means of gas wiping with air at 100° C. and under 0.1 kg/cm², the amount of depositing metal to 70 g/m² at each side and, without delay, a cooling nitrogen gas was applied to cool the plated steel sheet down to a temperature below 300° C. in 0.5 sec. thereby obtained a plated sheet of good appearance.

The steel sheet plated with Pb-Sn system alloy by hot dip plating had an Ni layer of about 0.15μ thick, an NiSn alloy layer of 0.18μ thick and a Pb-Sn system alloy palting layer of 70 g/m² (approx. 7μ thickness) at each side, and showed an excellent corrosion resistance and bonding strength.

EXAMPLE 4

A cold rolled steel sheet of 0.8 mm thick (as cold material) was pretreated under the same condition as Example 2. An electroplating with Ni was effected to form a backing plating layer of Ni to a thickness of 0.3μ at each side. The steel sheet having the Ni backing plating layer was then annealed in a reducing atmosphere of 10% $H_2-N_2$ mixture gas at 820° C. for 20 seconds and was immersed, without contacting with air, in an alloy bath of 12% Sn-88% Pb at 360° C. for 1.5 sec. Then, the amount of depositing metal was adjusted by a high-pressure $N_2$ gas wiping at 50° C. and under a pressure of 0.25 kg/cm² down to 50 g/m² at each side. The sheet was then brought into contact with a water-cooled roll to be cooled down to a temperature below 300° C. in 1.5 sec., to become a steel sheet plated by hot dip plating with Pb-Sn alloy having good appearance. The steel sheet thus formed had on each side thereof an Ni backing plating layer of about 0.2μ thick (Ni-Fe alloy partially formed due to diffusion of Fe), an NiSn alloy layer of 0.3μ thick and a Pb-Sn alloy plating layer of 50 g/m². This steel sheet showed an excellent corrosion resistance and bonding strength.

The steel sheets plated with Pb-Sn system alloy by hot dip plating obtained in Examples 1 thru 4 were subjected to tests for examining the corrosion resistance (salt spray corrosion test JIS 2371 at flat and mechanically deformed portions) and bonding strength of plating layers, the result of which being shown in annexed Table 4.

By way of reference, performances of reference (comparison) examples (suffixed with symbols a and b) are shown in the Table 4. More specifically, reference examples (a) were produced by directly plating the steel sheets with Pb-Sn system alloy by hot dip plating, while reference examples (b) were produced by cooling the steel sheets gradually, instead of applying the rapid cooling down to a temperature below 300° C. as adopted in the invention, after the hot dip plating with Pb-Sn system alloy subsequent to the backing plating with Ni on the steel surfaces.

From the test results shown in the Table 4, it will be seen that the products of the invention exhibits much superior corrosion resistance, workability and bonding strength of plating layers as compared with the reference examples which are the representatives of the conventional products.

Thanks to the superior corrosion resistance and bonding strength of the plating layers which in turn ensures an improved workability, the steel sheet in accordance with the invention can be optimumly used as the material of fuel tank not only for gasoline but also for alcoholic fuel. In addition, the present invention widens and diversifies the use of the terne plated steel sheet contributing greatly to the development of the field of industry concerned. Needless to say, the tank material of the invention can equally be used for the fuel tanks for containing pure alcoholic fuel, light oil or kerosene.

The superior effect brought about by the steel sheet of the invention, when used as the material of the fuel tank, will be fully understood from the description of Example 5.

EXAMPLE 5

A cold rolled steel sheet of 0.8 mm thick was subjected to an electrolytic degreasing which was conducted with 3% aqueous solution of ortho sodium silicate at a temperature of 70° C., electric current density of 10 A/dm² and for a length of time 3 seconds. The sheet was then subjected to an electrolytic pickling which was conducted with a 10% aqueous solution of Hcl at a room temperature and an electric current density of 10 A/dm² for 2 seconds. Using a plurality of steel sheets thus pretreated, Ni backing plating layers of various thicknesses were formed with the following Ni plating bath and electrolytic conditions, while varying the time length of the electrolytic process.

| Composition of Ni plating bath | | |
|---|---|---|
| $NiSO_4.7H_2O$ | 240 g/l | |
| $Nicl_2.6H_2O$ | 45 g/l | 45° C.-10 A/dm² |
| $H_3BO_3$ | 30 g/l | PH = 3.2 |

The steel sheets thus provided with backing plating Ni layer were immersed, after a rinsing with water, in baths of Pb-Sn alloys having different densities of Sn as shown in Table 3, at 350° C. for 5 seconds, by a wet flux method with 40% $Zncl_2$ aqueous solution. Then, a high pressure gas jet was applied to the sheets to provide different amounts of deposition metal. Thereafter, the steel sheets were cooled down to a temperature below 300° C. within 0.3 second to obtain a plurality of steel sheets having Pb-Sn system alloy plating layers in accordance with the invention.

In the steel sheets having Pb-Sn alloy plating layers formed by hot dip plating in accordance with the invention, the thickness of the Ni-Sn alloy mainly consisting of NiSn or the thickness of the composite plating layer of Ni+NiSn alloy layer was varied in accordance with the amount of deposition of the backing Ni plating layer.

By way of reference, reference examples as representative of conventional products were formed by directly immersing the pretreated steel sheets in the Pb-Sn alloy plating bath and then adjusting the amount of deposition of metal. The performances of the products of the invention and reference (comparison) examples are shown in annexed Table 5.

From the Table 5, it will be seen that the fuel tanks produced from the steel sheets of the invention exhibits much superior performance in every respects as compared with those which are produced from the conventional steel sheets.

Although the steel sheets of Examples 1 to 5 stated before are formed by a hot dip plating with Pb-Sn alloy, it has been confirmed by the present inventors that the products produced through a heating melting method explained before bring out the same advantage and exhibit the same superior performance.

TABLE 1

Thickness of NiSn alloy layer plus Pb-15% Sn alloy layer versus the performance of the coated sheet

| Thickness of coated layers | Performance of the coated layer | | Workability and adhesion of coated layer |
|---|---|---|---|
| | Corrosion resistance by salt spray test | | |
| | S.S.T. 24 hrs. | S.S.T. 120 hrs. | |
| NiSn alloy layer (0.01μ) + Pb-8% Sn (4μ) | ○ | x | ◎ |
| NiSn alloy layer (0.2μ) + Pb-8% Sn (4μ) | ◎ | ◎ | ◎ |
| NiSn alloy layer (0.5μ) + Pb-8% Sn (4μ) | ◎ | ◎ | ◎ |
| {Ni + NiSn alloy layer (0.3μ)} + Pb-8% Sn (4μ) | ◎ | ◎ | ◎ |
| NiSn alloy layer (3μ) + Pb-8% Sn (4μ) | ◎ | ◎ | x |
| {Ni + NiSn alloy layer** (3μ)} +Pb-8% Sn (4μ) | ◎ | ◎ | Δ |
| {Ni + NiSn alloy layer*** (15μ)} + Pb-8% Sn (4μ) | ◎ | ◎ | x |

Note:
(1) ◎ — Excellent
○ — Good
Δ — Fair
x — Poor
(2) *Determined by the extent of the stripped layer by tape stripping test after having subjected to reverse bend (repeated impact bending).
(3) **Ni 1.8μ, NiSn alloy layer 1.2μ
***Ni 14.2μ, NiSn alloy alyer 0.8μ

TABLE 2

Plating condition, workability, and adhesion of the plating

| Plating condition | Performance of plating | |
|---|---|---|
| | Alloy layers formed | Workability and adhesion |
| Ni plating 0.3μ Pb-10% Sn plating (350° C. × 7 sec dip) → rapid cooling | Ni layer and almost 100% NiSn alloy layers were formed | ◎ |
| Ni plating 0.3μ Pb-10% Sn plating (350°C. × 30 sec dip) → rapid cooling | Ni₃Sn₂ and Ni₃Sn₄ were formed in addition to Ni layer and NiSn alloy layer | Δ |
| Ni plating 0.3μ Pb-10% Sn plating (350° C. ×30 sec dip) → slow cooling | The same as above | x |

Note:
Symbol ◎ : excellent
Δ: fair
x: poor

TABLE 3

Effect of Sn content in the plating bath of Pb—Sn alloy on the performance of the plated article

| Sn Content (%) | Thickness of Ni layer | Travel speed of sheet metal | Extent of** NiSn layer | Corrosion* resistance | Appearance of plated surface |
|---|---|---|---|---|---|
| 3 | 0.10 | 30 m/min | ○-Δ | ○ | Δ |
| 3 | 0.10 | 60 m/min | ○-Δ | ○ | ◎ |
| 3 | 0.20 | 30 m/min | ◎ | ◎ | Δ |
| 3 | 0.20 | 60 m/min | ◎ | ◎ | ◎ |
| 6 | 0.10 | 30 m/min | ◎ | ◎ | ◎ |
| 6 | 0.10 | 60 m/min | ◎ | ◎ | ◎ |
| 6 | 0.20 | 30 m/min | ◎ | ◎ | ◎ |
| 6 | 0.20 | 60 m/min | ◎ | ◎ | ◎ |
| 12 | 0.10 | 30 m/min | ◎ | ◎ | ◎ |
| 12 | 0.10 | 60 m/min | ◎ | ◎ | ◎ |
| 12 | None | 60 m/min | x | x | ◎ |

Note
(1) *Corrosion resistance after 72 hrs salt spray test
(2) ◎ : Excellent, ○: Good, Δ: Fair, x: poor
(3) **Determined by scanning electron microscope and X ray diffraction after Pb—Sn alloy plated layer has been removed by electrolytic stripping.

TABLE 4

Performance of the sheet coated by immersion in a bath of Pb—Sn alloy according to the Examples

| | Corrosion of the flat portion of the test sheet by salt spray test after 24 hrs | Corrosion of the flat portion of the test sheet by salt spray test after 72 hrs | Corrosion of the* test sheet by salt spray test (16 hrs) at the portion subjected to Erichsen test | Workability** and adhesion of the coated layer |
|---|---|---|---|---|
| Example 1 | ⊚ | ⊚ | ⊚ | ⊚ |
| Comparison 1a | Δ | x | x | ⊚ |
| Comparison 1b | ○ | Δ | Δ | Δ |
| Example 2 | ⊚ | ⊚ | ⊚ | ⊚ |
| Comparison 2a | ○ | x | x | ⊚ |
| Comparison 2b | ⊚ | Δ | ○ | Δ |
| Example 3 | ⊚ | ⊚ | ⊚ | ⊚ |
| Comparison 3a | x | x | x | ⊚ |
| Comparison 3b | ○ | Δ | Δ | Δ |
| Example 4 | ⊚ | ⊚ | ⊚ | ⊚ |
| Comparison 4a | x | x | x | ⊚ |
| Comparison 4b | ○ | Δ | x | x |

Note
1. ⊚: Excellent, ○: Good, Δ: Fair, x: Poor
2. *For test sheet of 1 mm thickness Erichsen cupping test was conducted at a height of 6 mm and for test sheet having a thickness other than 1 mm tests were conducted in accordance with the method specified by JIS (Japan Industrial Standards)
**Determined by the extend of stripping by tape stripping after having been subjected to Reverse Bend Test.

TABLE 5

Performance of the material of the present invention for fuel tank

| | | Items of testing | | | | |
|---|---|---|---|---|---|---|
| | | Corrosion resistance of the plated sheet by salt spray test (SST) | | | Promoted corrosion* test for gasoline tank use | |
| Kind of test sheet | | Flat S.S.T. 24 hrs | Portion S.S.T. 120 hrs | Worked portion Corrosion resistance of the portion after having subjected to bulging 24 hours SST test | Gasoline (7 parts) plus 1% NaCl salt water (3 parts) test period 2 months | Rapid corrosion solution (containing) blow-by gas test period 7 days |
| Present invention | Ni + NiSn alloy layer (0.5μ) + Pb-5% Sn (4μ) | ○ | ○ | ⊚ | ⊚ | ⊚ |
| | NiSn alloy layer (0.2μ) + Pb-8% Sn (4μ) | ○ | ⊚ | ⊚ | ⊚ | ⊚ |
| | NiSn alloy layer (0.3μ) + Pb-10% Sn (3μ) | ○ | ⊚ | ⊚ | ⊚ | ⊚ |
| | Ni + NiSn alloy layer (0.3μ) + Pb-10% Sn (4μ) | ⊚ | ⊚ | ⊚ | ⊚ | ⊚ |
| | Ni + NiSn alloy layer (0.1μ) + Pb-15% (4μ) | ⊚ | ⊚ | ⊚ | ⊚ | ⊚ |
| Comparison | Pb-10% Sn (5μ) | x | x | x | Δ | x |
| | Pb-15% Sn (4μ) | ○ | x | x | ○ | x |

TABLE 5-continued

Performance of the material of the present invention for fuel tank

| Kind of test sheet | | Items of testing Promoted corrosion test using** various alcoholic fuel | | | |
|---|---|---|---|---|---|
| | | Gasoline (8.9 parts) plus methyl alcohol (1 part) plus water (0.1 part) test period 6 months | Gasoline (8.9 parts) plus ethyl alcohol (1 part) plus water (0.1 part) test period 6 months | Gasoline (8.9 parts) plus methyl-alcohol (0.08 part) plus olmaldehyde (0.02 part) test period 6 months | Gasoline (8.9 parts) plus ethyl alcohol (1 part) plus water (0.08%) plus aceto aldehyde (0.02 part) test period 6 months |
| Present invention | Ni + NiSn alloy layer (0.5μ) + Pb-5% Sn (4μ) | ◉ | ◉ | ◉ | ○ |
| | NiSn alloy layer (0.2μ) + Pb-8% Sn (4μ) | ◉ | ◉ | ◉ | ◉ |
| | NiSn alloy layer (0.3μ) + Pb-10% Sn (3μ) | ◉ | ◉ | ◉ | ◉ |
| | Ni + NiSn alloy layer (0.3μ) + Pb-10% Sn (4μ) | ◉ | ◉ | ◉ | ◉ |
| | Ni + NiSn alloy layer (0.1μ) + Pb-15% Sn (4μ) | ◉ | ◉ | ◉ | ◉ |
| Comparison | Pb-10% Sn (5μ) | △ | △ | △ | △ |
| | Pb-15% Sn (4μ) | ○-△ | ○-△ | △ | △ |

| Kind of test sheet | | Items of testing Corrosion resistance by outdoor exposure test for exterior surface of gasoline tank | |
|---|---|---|---|
| | | Industrial area test period 6 months | Exposed in Industrial area sprayed with 5% salt water one time/day for 6 months |
| Present invention | Ni + NiSn alloy layer (0.5μ) + Pb-5% Sn (4μ) | ◉ | ○ |
| | NiSn alloy layer (0.2μ) + Pb-8% Sn (4μ) | ◉ | ◉ |
| | NiSn alloy layer (0.3μ) + Pb-10% Sn (3μ) | ◉ | ◉ |
| | Ni + NiSn alloy layer (0.3μ) + Pb-10% Sn (4μ) | ◉ | ◉ |
| | Ni + NiSn alloy layer (0.1μ) + Pb-15% Sn (4μ) | ◉ | ◉ |
| Comparison | Pb-10% Sn (5μ) | x | x |
| | Pb-15% Sn (4μ) | x | x |

Note:
(1) ◉ — Excellent
○ — Good
△ — Fair
x — Poor
(2) *Test containers were prepared by drawing the plated sheet into square cylinders with drawing ratio of 2 and then having been filled with respective corrosion test solution and sealed.
**Consisting of formaldehyde 30 ppm + $SO_4^{--}$ 500 ppm + $NO_3^{31}$ 200 ppm + $Cl^{-1}$ 10 ppm (simulated for exhaust liquid of blow-by gas)

What is claimed is:

1. A method of producing a steel sheet plated with a Pb-Sn alloy, suitable for use as the material for automobile fuel tanks adapted to receive alcohol-containing fuel therein, said method comprising the steps of:

(1) plating a steel sheet with Ni to a thickness of 0.01 to 1μ;

(2) dipping said steel sheet in a plating bath of a Pb-Sn system alloy at 320° to 400° C. for 1 to 10 seconds to effect a hot dip plating; and then (3) cooling said steel sheet rapidly down to a temperature below 300° C. within 3 seconds, thereby forming a first layer of Ni-Sn alloy consisting only of stoichiometric NiSn phase brought about by both the reaction between said plated Ni and said plated Pb-Sn alloy and said cooling, a second layer of plated Pb-Sn alloy formed on said NiSn phase alloy, and optionally a Ni backing layer formed on said steel sheet, the total of both said Ni-Sn layer and said Ni backing layer, when present, being 0.035 to 1 micron in thickness.

2. A method of producing a steel sheet plated with a Pb-Sn system alloy, suitable for use as the material for automobile fuel tanks adapted to receive alcohol-containing fuel therein, said method comprising the steps of:

(1) plating a steel sheet with Ni to a thickness of 0.01 to 1μ;

(2) effecting an electroplating to form a Sn plating layer of the Ni layer;

(3) effecting an electroplating to form a Pb plating layer on said Sn plating layer; and (4) effecting a heating melting treatment at a temperature between 232° and 450° C., thereby forming a first layer of Ni-Sn alloy consisting only of stoichiometric NiSn phase brought about by the reaction between said plated Ni and said plated Sn, a second layer of Pb-Sn alloy formed on said NiSn phase alloy, and optionally a Ni backing layer formed on said steel sheet, the total of both said Ni-Sn layer and said Ni backing layer, when present, being 0.035 to 1 micron in thickness.

* * * * *